Jan. 7, 1958          L. V. FOSTER          2,818,765
METHOD AND MEANS FOR ACHROMATIZING PRISMS
Filed Oct. 8, 1956
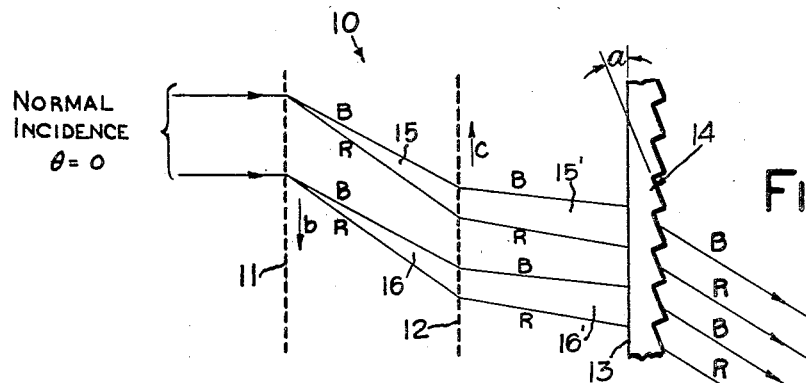
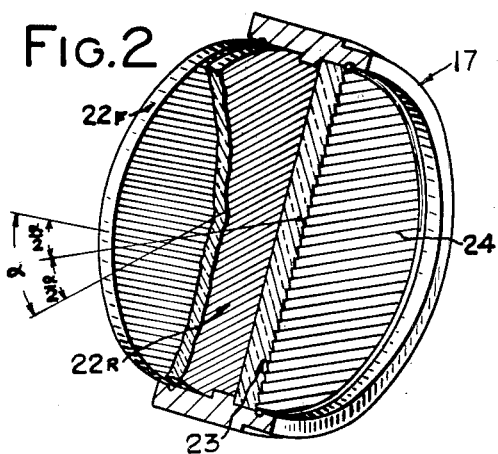
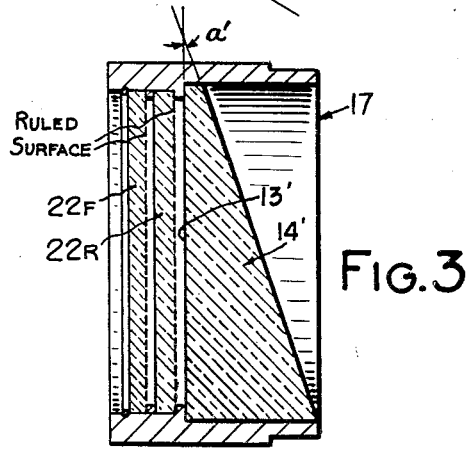
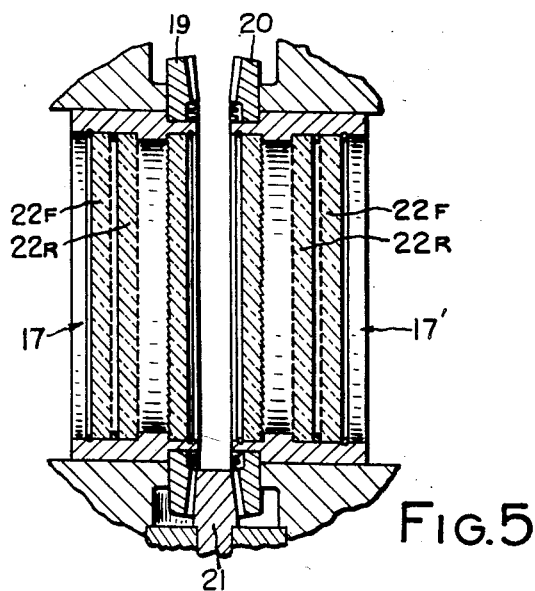
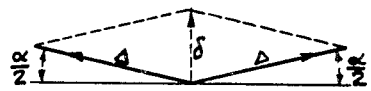
INVENTOR.
LEON V. FOSTER
BY
ATTORNEY United States Patent Office 2,818,765
Patented Jan. 7, 1958

2,818,765

METHOD AND MEANS FOR ACHROMATIZING PRISMS

Leon V. Foster, Irondequoit, N. Y., assignor to Bausch & Lomb Optical Company, Rochester, N. Y., a corporation of New York Application October 8, 1956, Serial No. 614,500

9 Claims. (Cl. 88—1)

This invention relates to means and method for achromatizing prisms and the like and more particularly it relates to diffraction grating means for performing the achromatization.

Many types of optical apparatus, such as large gunsights, range finders, etc., require optical prisms or wedges that are achromatic with respect to transmitted light. Heretofore, these requirements have been met by prismatic type compensators which have the disadvantages of being bulky and expensive and have a relatively small deviation of transmitted light. These disadvantages may be completely overcome when the prisms are achromatized by combining diffraction gratings with prisms in a specified manner. For best use, the achromatizing means should not only be capable of completely achromatizing transmitted light but should also be easily adaptable to the correction of a wide variety of chromatic aberrations in prisms.

It is an object of this invention to provide achromatization of a prism by light diffracting means and furthermore to provide by this means an uncommonly large deviation of the line of sight in optical instruments which use achromatized prisms.

Another object of this invention is to provide achromatization of a prism by combination therewith of a diffraction grating whereby the achromatized prism is light in weight, and is compact and small in size for installation in restricted spaces.

It is a further object to provide such an achromatized prism for completely neutralizing all parts of the transmitted spectrum, the achromatizing means being effective to entirely achromatize various prisms which have spectrally different chromatic aberrations.

Further objects and advantages will be apparent in the details of construction and the arrangement and combination of parts as hereinafter described in the specification and shown in the accompanying drawing in which:

Fig. 1 is a diagrammatic view of an achromatically corrected prism incorporating the principles of this invention, Fig. 2 is a perspective view, partly broken away and shown in section, of one form of my invention, Fig. 3 is a vertical sectional view of another form of my invention, Fig. 4 is a vector diagram explanatory of Fig. 2, and Fig. 5 is a vertical sectional view of a compensator embodying the construction shown in Fig. 1.

This invention is based on certain well-known properties of gratings and prisms, one being that diffraction gratings disperse transmitted light in an opposite manner to glass prisms, i. e., a grating deviates red light more than blue light whereas a prism deviates blue light more than red light. Another useful property of gratings is that the more lines per unit of grating surface, the greater is the deviation of the spectral orders in the light transmitted thereby. Furthermore, the deviation power of a grating is considerably greater than that of a prism so that combinations of gratings with prisms are capable of much greater combined deviation of light.

As shown diagrammatically in Fig. 1, this invention typically comprises an achromatic prism unit generally indicated at 10 which includes a first diffraction grating indicated at 11 and a second diffraction grating indicated at 12, the grating surface of each being mounted substantially parallel with a refracting surface 13 of a prism 14 to be achromatized. For the sake of reducing the overall size of the device, a Fresnel type prism 14 is preferred and illustrated, although a regular prism 14' as shown in Fig. 3 may be used with equal effect.

According to one form of this invention, the grating constant, i. e., the number of lines per millimeter in the ruling, pertaining to diffraction grating 11 is greater than the grating constant of diffraction grating 12 and consequently grating 11 produces greater deviation of the transmitted spectrum. The rulings of gratings 11 and 12 are arranged with their line structures, i. e., the lines on the grating surface that are formed by the rulings, parallel to each other and parallel to the line or groove structure of the Fresnel prism 14. If an ordinary three-sided prism is used instead of the Fresnel prism 14 such as shown at 14' in Fig. 3 of the drawing, said rulings are arranged parallel to the base of the prism. Said gratings should not be in optical contact with each other although the thickness of the airspace therebetween is not critical.

The gratings 11 and 12 are specially blazed to produce the results described hereinafter. Currently, diffraction gratings are "blazed" by controlling the groove face angle of the rulings so as to concentrate the transmitted spectral energy in the desired region of the spectrum. Therefore, the term "blazing" may be defined as being the art of controlling the distribution of energy which comes from the grating by controlling the contours or face angles of its ruled grooves. The "blaze" accordingly governs the direction in which the transmitted energy is concentrated and in this invention the grating is blazed to produce maximum energy in the first order spectrum, this energy being preferably concentrated on one side of the zero order as illustrated in Fig. 1.

It is important that the "blaze" of the respective gratings 11 and 12 be arranged in opposition to each other as indicated by the arrows $b$ and $c$ in Fig. 1 whereby the respective dispersions of the gratings will act in opposition to each other to produce what is called a "residual dispersion." The residual dispersion may be defined as the algebraic sum of the dispersions of the gratings 11 and 12 when the dispersion of grating 11 is considered positive and the other dispersion is considered negative. Two of such diffracted spectra are shown at 15 and 16 in Fig. 1, the blue end and the red end of each spectrum being designated B and R, respectively. At the second grating 12, said spectra are rediffracted to form the spectra 15' and 16' which enter the Fresnel prism 14 in a condition of dispersion which just matches the dispersion of the prism so that white light is transmitted thereby.

With respect to one specific operative example of this form of my invention, light is assumed to enter the grating 11 at normal incidence from the left in Fig. 1. The grating 11 which is ruled at 300 lines per millimeter produces a deviation of the diffracted first order spectra 15 and 16 which is 11°21'18.1" for red light designated by R, and 8°23'8" for blue light designated by B.

The diffracted spectra 15 and 16 are rediffracted by the diffraction grating 12 which is ruled at 278.9 lines per millimeter and is placed so that its blaze is opposite and parallel to that of grating 11. The beams 15' and 16' emerging from the grating 12 are deviated less than the deviation that is provided by the grating 11, the beams being partially reunited so that those spectra are then deviated closer to "normal incidence," the deviation angles being only 0°47'32" and 0°35'17" for red and blue light, respectively. This substantially compensates the dispersion of the Fresnel prism 14 which has an angle $a$ of 22° between its refractive surfaces and is made from glass having a dispersion $$\nu = \frac{n_D - 1}{n_F - n_C} = 57.8$$

The difference between the grating constants 300 and 278.9 relative to the gratings 11 and 12, is precalculated to produce said residual dispersion of the spectra 15′ and 16′. Consequently, the gratings 11 and 12 and prism 14 comprise a combination of optical elements which cooperatively produce deviated color-free, white light.

A preferred commercial form of this invention is shown diagrammatically in Fig. 2 of the drawing wherein the residual dispersion for achromatizing the prism is secured in a different manner. According to this form of the invention, two similar diffraction gratings 22F and 22R, located in front and rear positions, respectively, and each having the same grating constant or periodicity of ruling, are placed with their ruled surfaces parallel to each other and parallel to a plane which passes through the apex of angle $a$ Fig. 1, between the entrance and exit surfaces of a Fresnel prism 23, similar to the prism 14. An ordinary triangular prism 14′ may be substituted for the Fresnel prism 23 as shown in Fig. 3 if desired, in which case said ruled surfaces are both positioned parallel to a single plane which passes through the apex of the included angle $a'$ between the entrance and exit refractive surfaces on that prism. In Fig. 2, the line or groove structure of the prism 23 is indicated by the shade lines 24 and it will be noted that the gratings 22F and 22R may be rotated during assembly individually in opposite directions from a neutral or zero deflection position through an angle $$\frac{\alpha}{2}$$

relative to the lines 24 to position the line structures of the respective gratings at an angle $\alpha$ to each other. Said angle $\alpha$ is precalculated as explained hereinafter so that when the gratings 22F and 22R are positioned in this manner with the blaze of one grating arranged to oppose the blaze of the other grating, the chromatic aberration of the Fresnel prism 23 is substantially compensated. The resultant deviation of the spectra by the gratings 22F and 22R does not lie in a plane perpendicular to the line structure of either of said gratings but only the perpendicular component of the deviation of grating 22R opposes the deviation of the grating 22F, considering the individual deviations as vector quantities. The combined effect of the diffractions produced by the mutual inclination and opposition of the respective rulings is to yield a residual dispersion which is equal and opposite to the dispersion of the prism 23 and also matches its spectral quality.

To specifically elucidate the preferred form of my invention, the analytical and computational procedure for obtaining constructional data for a typical achromatized prism having two like gratings 22F and 22R is given herebelow.

The deviation for the various wavelengths of light by a given grating is obtained by the mathematical expression, $$\sin \Delta = \frac{\lambda + e \sin \theta}{e}$$

wherein, $\Delta$ = deviation of grating for wavelength $\lambda$
$e$ = grating constant
$\theta$ = angle of incidence of light on grating
$\lambda$ = wavelength of light When the two similar gratings 22F and 22R are combined, their resultant deviation may be graphically shown by the vector diagram of Fig. 4 in which, $\delta$ = the resultant deviation
$\Delta$ = deviation of either grating alone
$\alpha$ = angle of rotation between line structure of two gratings The resultant dispersion due to the combination of the two like gratings with the line structures thereof rotated before assembly with respect to each other through the angle $\alpha$ is given by the mathematical expression, (1) $\qquad \delta_C - \delta_F = (\Delta_C - \Delta_F) \sin \alpha$ wherein $$\delta_C = \Delta_C \sin \alpha$$
$$\delta_F = \Delta_F \sin \alpha$$

If $D_C - D_F$ represents the dispersion of the prism to be achromatized, D being the deviation of the prism for wavelength $\lambda$, then $$D_C - D_F = \delta_C - \delta_F$$

By substituting values of $D_C - D_F$ and $(\Delta_C - \Delta_F)$ in Formula 1 and solving for $\alpha$, the relative inclination or rotation of the line structure of the gratings 22F and 22R may be determined.

In either of the disclosed forms of my invention, the two gratings are permanently assembled together with a small intervening air space therebetween in an individual cell 17 or 17′ which also holds the associated prism in spaced relation thereto as shown in Fig. 2, thereby providing a completely achromatized prism in a single small unit. Light may be incident on either side of said unit and the gratings may be placed on either side of the prism with equally good effect.

As shown in Fig. 5, the aforementioned large deviation of each unit which is inherent in my invention is advantageously utilized by rotatably mounting two of the prism units 17 and 17′ face to face in a Risley type mounting 18 to form a compensator which transmits white light. By means of bevel gears 19 and 20 fixed on the inner ends of the cells 17 and 17′, these achromatic prism units may be simultaneously rotated in opposite directions by a drive gear 21 meshed with the gears 19 and 20. By this means the deviations of the respective prism units 17 and 17′ may be combined additively or subtractively to produce all intermediate values of deviation between double and zero deviation of the transmitted spectra.

As heretofore intimated, each unit 17 and 17′ may be used reversibly since the light may be incident on either side. Various arrangements of the constituent parts may be used such as placing the prism on one side or the other of the two gratings or placing the prism between the two gratings. The intervening space between both gratings and between the associated prism may be large if desired so long as the effective size of the aperture of the optical system in which these parts are used is made large enough to pass the required amount of light. In any operative arrangement, the gratings should preferably face in the same direction and the plane of each grating should preferably be substantially parallel to a single refractive face on the prism to be compensated, although an operative achromatic prism may be provided by locating the ruled surfaces of the gratings parallel to a plane lying within the angle $a$ of Fig. 1 as mentioned heretofore. Furthermore, the angle between the line structure of one grating and the base of the prism or corresponding part should be the same as the angle between the line structure of the other grating and the base of the prism or corresponding part. In the first described form of this invention, said angle is zero degrees for both gratings and in the second described form, the line structures of the two gratings are rotated by the same amount in opposite directions so as to establish the same angle $$\left(\frac{\alpha}{2}\right)$$

between the base of the prism and each of the line structures.

It will be observed that the present invention provides effective grating means for completely achromatizing the light transmitted by deviation prisms of various kinds and furthermore the gratings may be variously constructed and arranged with respect to the associated prism so as to compensate for extensive ranges of chromatic aberrations produced by optical prisms.

Although only certain forms of my invention have been shown and described in detail, other forms and modifications are possible and changes may be made in the details of construction and arrangement of parts without departing from the spirit of the invention as defined in the claims appended herebelow.

I claim:

1. A prism unit comprising a light dispersing prism and means for achromatizing the prism comprising a pair of diffraction gratings positioned in optical alignment with the prism, the blaze of one grating being positioned opposite to the blaze of the other grating to produce a residual dispersion which substantially compensates the dispersion of the prism.

2. A prism unit comprising a light dispersing prism and means optically aligned therewith for achromatizing said prism, said means comprising two diffraction gratings which are positioned with the blaze of one grating in opposition to the blaze of the other grating, the dispersion produced by one grating exceeding the dispersion produced by the other grating by a residual amount which is substantially equal and opposite to the dispersion of said prism.

3. A prism unit comprising a light dispersing prism and means optically aligned therewith for achromatizing said prism, said means comprising two diffraction gratings which produce maximum energy in the first order spectra, said gratings being positioned so that their dispersions oppose each other and the respective directions of said dispersions are symmetrical with the direction of dispersion of said prism, the dispersion of one grating exceeding the dispersion of the other grating by a residual amount which is equal and opposite to the dispersion of said prism.

4. A prism unit comprising a light dispersing prism and means for achromatizing said prism comprising two diffraction gratings positioned in optical alignment with each other and with said prism so as to successively deviate light rays, the line structure of both gratings lying at the same angle to the base of said prism, the blaze of one grating being positioned in opposed relation to the blaze of the other grating whereby the gratings produce opposed dispersions of the transmitted light rays, the dispersion produced by one grating exceeding that produced by the other grating by an amount which substantially equals the dispersion of the prism.

5. A prism unit comprising a light dispersing prism and means for achromatizing the prism comprising two diffraction gratings positioned in optical alignment with each other and with the prism, said gratings being positioned to successively diffract light rays before they are incident upon the prism, the line structure of said gratings lying at the same angle to the base of said prism, the blaze of one grating being positioned in opposed relation to the blaze of the other grating whereby the gratings produce opposed dispersions of the light rays, the dispersion produced by one grating exceeding that produced by the other grating by an amount that substantially equals the dispersion of the prism.

6. A prism unit comprising a light dispersing prism and means for achromatizing said prism comprising two diffraction gratings positioned in optical alignment with each other and with said prism so as to successively deviate transmitted light rays, the plane of each grating being substantially parallel with a single face of said prism, the line structure of at least one grating extending in a direction parallel to the base of said prism, the blaze of one grating being positioned in opposed relation to the blaze of the other grating whereby the gratings produce opposed dispersions of said light rays, the dispersion produced by one grating exceeding that produced by the other grating by an amount which substantially equals the dispersion of the prism.

7. In combination with a light dispersing prism, diffraction grating means optically aligned therewith for achromatizing said prism, said means comprising a first diffraction grating positioned substantially parallel to and spaced from an adjacent face of said prism and having a ruling thereon which produces maximum energy in the first order of diffraction, and a second diffraction grating formed similarly to the first grating and arranged substantially parallel thereto between the first grating and the prism, the blaze of the rulings of the first and second gratings being oriented substantially oppositely to each other so as to produce opposed dispersions and being formed with their grating constants differing from each other by a predetermined amount which corresponds to the dispersion of the prism whereby a compensating residual dispersion is produced by the grating means that is substantially equal and opposite to the dispersion of the prism.

8. In combination with a light dispersing prism, diffraction grating means aligned therewith for achromatizing said prism, said means comprising a diffraction grating located in spaced relation to an adjoining refracting face of said prism and having a ruling thereon which transmits maximum energy in the first order of diffraction, and further comprising a second diffraction grating having a ruling thereon which is formed similarly to the first ruling, said gratings being arranged in substantially parallel planes which are parallel with said refracting face and having the blaze of one grating positioned in opposition to the blaze of the other grating so that their dispersions are opposed to each other, one grating being rotatable so that it may be set with its line structure at such a predetermined angle to the line structure of the other grating that the vector sum of the opposing dispersions of the two gratings is made equal to the dispersion of said prism.

9. In combination with an optical prism, means for achromatizing said prism comprising a pair of diffraction gratings arranged in optical alignment therewith and parallel to each other and parallel to an adjoining refractive face of said prism, said gratings each having a blaze formed thereon which principally transmits first order spectra which have their energy distributed predominantly on one side of zero, the blaze of one grating being positioned in opposed relation to the blaze of the other grating so that the gratings produce opposed dispersions of transmitted light rays, the dispersion produced by one grating exceeding that produced by the other grating by an amount which substantially equals the dispersion of the prism.

References Cited in the file of this patent

UNITED STATES PATENTS

| | | |
|---|---|---|
| 734,133 | Porter | July 21, 1903 |
| 755,983 | Wood | Mar. 29, 1904 |

FOREIGN PATENTS

| | | |
|---|---|---|
| 319,865 | Germany | Apr. 1, 1920 |